(No Model.)
T. HORTON.
HAND CORN PLANTER.
No. 257,821. Patented May 9, 1882.
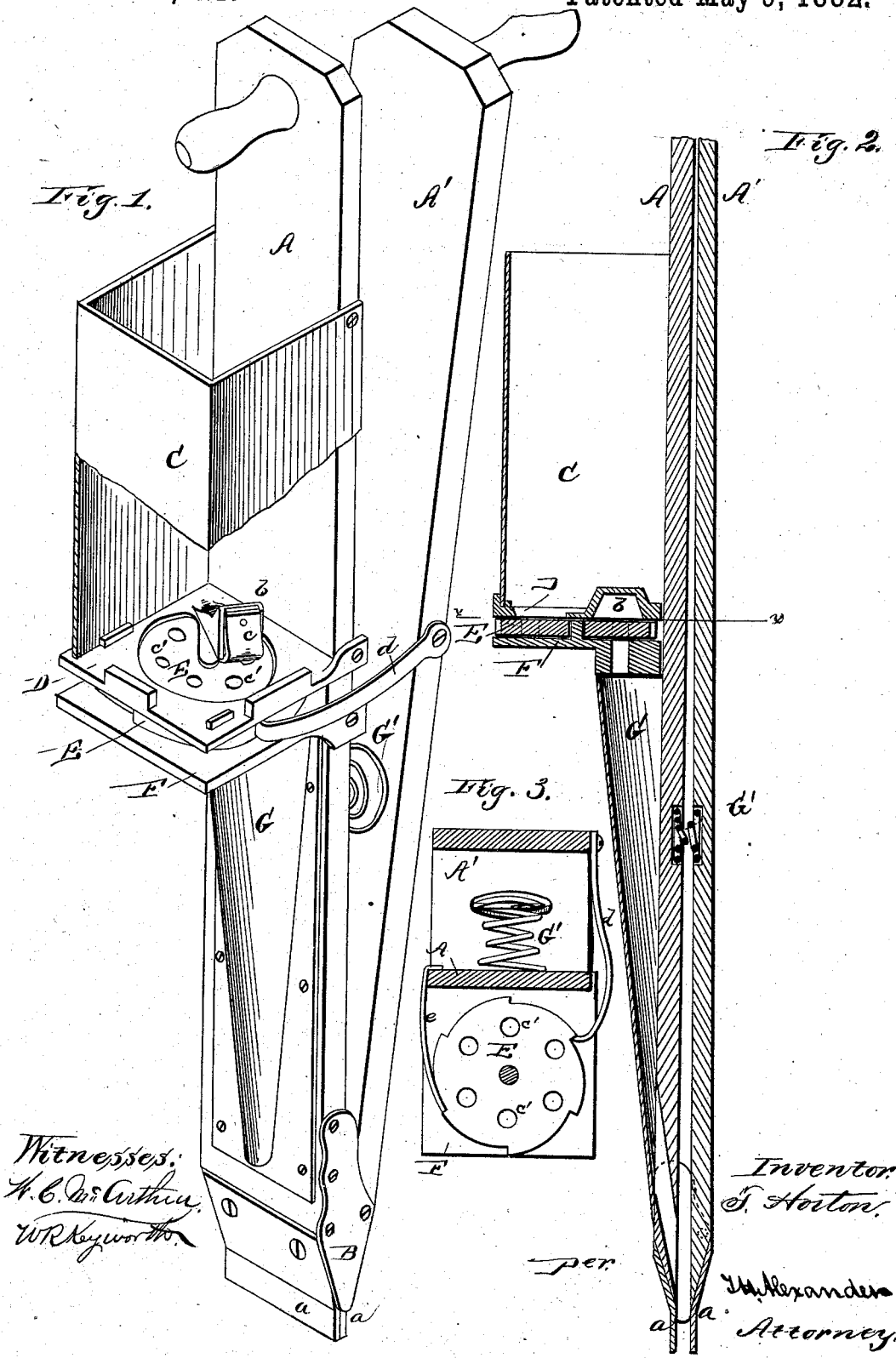

UNITED STATES PATENT OFFICE.

THEODORE HORTON, OF BLUFFTON, INDIANA, ASSIGNOR TO HIMSELF, AND WASHINGTON I. FITCH AND WILLIAM W. WISILL, SR., BOTH OF SAME PLACE.

HAND CORN-PLANTER.

SPECIFICATION forming part of Letters Patent No. 257,821, dated May 9, 1882.

Application filed February 18, 1882. (No model.)

*To all whom it may concern:*

Be it known that I, THEODORE HORTON, of Bluffton, in the county of Wells and State of Indiana, have invented certain new and useful Improvements in Hand Corn-Planters; and I do hereby declare that the following is a full, clear, and exact description thereof, reference being had to the accompanying drawings, and to the letters of reference marked thereon, which form part of this specification, and in which—

Figure 1 is a perspective view, partly broken away to show the interior of the feed-box. Fig. 2 is a central vertical section through my invention. Fig. 3 is a horizontal section through line $x\,x$, Fig. 2.

This invention relates to hand corn-planters wherein two flat staffs are employed, which are pivoted together at their lower penetrating ends, and provided with handles fixed to their upper or free ends, the hopper and dropping devices being applied on one side of one of the staffs, and the pawl for actuating the dropping-wheel being applied to the other staff. The improvements which I have made on this kind of dropper or planter are designed for facilitating their manipulation in the field and relieving the operator from much labor, as will be fully understood from the following description, when taken in connection with the annexed drawings.

A A' designate two flat staffs, which are provided with handles at their upper ends and with flat penetrating plates $a\,a$ at their lower ends.

B B are two cheek-plates, which are rigidly secured to the edges of the staff A, and to these plates the staff A' is pivoted so that when the upper ends of the two staffs are fully separated, as shown in Fig. 1, the lower ends of the point-plates $a\,a$ will touch and form the penetrating end of the implement.

C designates the hopper, which is secured on the face of the staff A and fitted upon a frame, D, which is secured to the staff A, and which has for its bottom an intermittent rotating wheel, E. This wheel E is arranged upon a bracket, F, secured to the staff A, and through this bracket the charges of corn are dropped and conducted to the bottom of the implement through a passage, G. The frame D is cast with a large opening through it, on one side of which is a gateway, $b$, provided with a flexible cut-off, $c$, at its entrance.

The dropping-wheel E has a number of cells, $c'$, through it, arranged equidistant from each other, and of a capacity corresponding to the charges of corn which it is desired to leave in a hill. The periphery of this wheel has ratchet-teeth formed on it, with which the hooked end of a spring-pawl, $d$, engages for the purpose of giving intermittent rotary motion to the wheel for dropping the charges of corn from the hopper C. This pawl $d$ is pivoted to one edge of the staff A', and is actuated by giving this staff a vibratory movement. The wheel E is prevented from turning backward by means of a spring retaining-pawl, $e$, which is secured to the staff A.

Between the two staffs A A', at a point below the hopper, I suitably secure a spiral spring, G', which is a double cone, as shown in Fig. 2. The object of using this kind of spring is to allow the two staffs to be brought very close together. The object of the spring is to separate the staffs, close the plates $a\,a$, and cause the pawl $d$ to move the wheel E and drop a charge of corn from the hopper to the bottom of the passage G, ready to be deposited into the soil when the staffs are pressed together.

It is obvious that the staffs may be both opened and shut by the hands grasping both of the handles; but this is a slow and laborious mode of handling the implement.

By employing the spring G' in the combination described the implement can be held by the handle on the staff A and thrust into the soil, and the staff A' operated to effect the dropping by simply striking it with one hand. The implement can be carried in one hand (either hand) and the closing of the staff A' against the staff A effected by the other hand.

It is important that both staffs A A' should be of the same length, and that each staff should be provided at its upper part with a handle, so that the operator can use either staff as the thrusting-staff. It is also important that a spring self-acting pawl, $d$, be applied to the staff A' to operate the dropping-wheel.

I am aware that short valve-actuating levers have been combined with the long hand-staffs of hand corn-planters, and that such short staffs have been acted on by springs, and such contrivances I do not claim as my invention.

Having described my invention I claim—

A hand corn-planter having the following elements: the two hand-staffs A A', pivoted together, the penetrating blades $a\ a$, the handles on said staffs, a spring interposed between the staffs, a hooked spring-pawl, $d$, pivoted to the staff A', a retaining spring or pawl, $e$, attached to the staff A, the ratchet dropping-wheel E, the perforated bracket F, the cast-metal frame D, the gateway, its cut-off, the hopper-box, and the tube G, fixed to the staff A, all arranged and constructed as herein described.

In testimony that I claim the foregoing as my own I affix my signature in presence of two witnesses.

THEODORE HORTON.

Witnesses:
T. H. ALEXANDER,
WM. R. KEYWORTH.